United States Patent Office 3,574,733
Patented Apr. 13, 1971

3,574,733
2-(HEXAFLUORO - 2 - HYDROXY-2-PROPYL)-
ALKANOIC ACIDS AND PROCESS FOR PRE-
PARING THEM
Everett E. Gilbert, Morristown, and James O. Peterson,
Convent Station, N.J., assignors to Allied Chemical
Corporation, New York, N.Y.
No Drawing. Filed Oct. 30, 1968, Ser. No. 772,050
Int. Cl. C07c 59/04, 65/02
U.S. Cl. 260—535                                    9 Claims

ABSTRACT OF THE DISCLOSURE

Reaction products of hexafluoroacetone and monocarboxylic or dicarboxylic alkanoic acids, useful as surface tension reducing agents, and their preparation by heating a mixture of hexafluoroacetone and the alkanoic acid at a temperature of at least about 150° C.

---

This invention relates to 2-(hexafluoro-2-hydroxy-2-propyl)-alkanoic acids useful as surface tension reducing agents and to a process for preparing them.

The fluoroalcohol acids of our invention have the formula shown below:

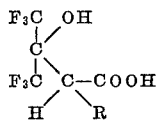

wherein R represents hydrogen, phenyl, an alkyl group of 1–7 carbon atoms or the radical —$(CH_2)_n$COOH wherein n is an integer from 1–7 inclusive.

All the compounds embraced within the above formula except where R is H are new, and all the new compounds are useful as surface tension reducing agents, a properly not shared by the single known compound wherein R represents hydrogen.

The flouroalcohol acids are the reaction products of hexafluoroacetone and either a monocarboxylic alkanoic acid of 1–8 carbon atoms in the alkane chain or a dicarboxylic alkanoic acid of 2–8 carbon atoms in the alkane chain, said acid having at least one hydrogen atom on a carbon alpha to a carbonyl group.

It is known to react hexafluoroacetone with compounds containing active methylene groups, and specifically to react hexafluoroacetone with malonic acid, $H_2C(COOH)_2$, carrying out the reaction in a pyridine medium at room temperature (Knunyants, Chen Ching-yun and N.P. Gambaryan, Izvestiya Akademii, Nauk, U.S.S.R. Otdelenie Khimicheskikh, Nauk No. 4, pp. 686–692, April 1960 and Knunyants et al., in Zhur. Vsesoyuz. Khim. Obshchestva im. D. I. Mendeleva 5, No. 1, pp. 112–113 (1960). The reaction of malonic acid and hexafluoroacetone produces 2-(hexafluoro-2-hydroxy-2-propyl)-ethanoic acid, a monocarboxylic acid. This is the well known Knoevenagel reaction in which aldehydes and ketones condense with the hydrogens in an active methylene group in the presence of an amine as catalyst. An active methylene group is a —$CH_2$ group flanked on both sides by negative groups.

When dicarboxylic alkanoic acids of higher carbon content than malonic acid, and which thus do not contain an active methylene group, are mixed with hexafluoroacetone in pyridine according to the prior art teachings referred to above, no reaction whatever appears to take place. Thus efforts to prepare reaction products of hexafluoroacetone and such dicarboxylic acids have been unsuccessful. Moreover when monocarboxylic alkanoic acids are similarly mixed with hexafluoroacetone in the presence of pyridine or other amine catalyst according to the above prior art procedure, no product formation takes place.

As far as we are aware, no process has been proposed for preparing reaction products of hexafluoroacetone and carboxylic acids wherein no active methylene groups are available for reaction, and furthermore, no process has been proposed for peparing reaction products of hexafluoroacetone and dicarboxylic acids.

An object of the present invention is to provide a process for preparing reaction products of hexafluoroacetone and monocarboxylic alkanoic acids containing no active methylene groups, but having at least one hydrogen atom on a carbon alpha to a carboxylic group.

Another object of the invention is to provide a process for preparing 2-(hexafluoro-2-hydroxy-2-propyl) substituted alkanoic monocarboxylic acids of 1 to 8 carbon atoms in the alkane chain, and for preparing such 2-substituted dicarboxylic acids having 2 to 8 carbon atoms in the alkane chain.

These and other objects are accomplished according to our invention wherein a mixture of hexafluoroacetone and an alkanoic acid of the formula

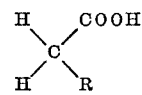

wherein R represents hydrogen, phenyl, an alkyl group of 1 to 7 carbon atoms or the radical —$(CH_2)_n$COOH wherein n is an integer from 1 to 6 inclusive, are heated at a temperature of at least about 150° C., preferably between about 200° C. and about 300° C., and preferably under autogeneous pressure, for periods sufficient to provide the desired yields of reaction product, usually for periods between about 24 hours and about 200 hours, depending somewhat on the temperature employed.

The mole ratio of hexafluoroacetone and alkanoic acid employed is not critical. Generally about 0.5 to 6 moles of hexafluoroacetone per mole of alkanoic acid are employed.

No catalyst or extraneous reaction medium is required in our process, and there appears to be little or no tendency for the dicarboxylic acids to break down to the monocarboxylic compound with release of $CO_2$ as is the case when malonic acid is reacted with hexafluoroacetone, so that when a dicarboxylic acid reactant is used in our process, a dicarboxylic acid product is produced.

Our process is not only uniquely applicable to the preparation of dicarboxylic acid products, but it is also effective in preparing the monocarboxylic acid products, and, in both cases, our process provides an advantageous method in which no catalyst or extraneous reaction medium is required, and which therefore facilitates easy recovery of the product.

The process of our invention can be represented by the equation shown below.

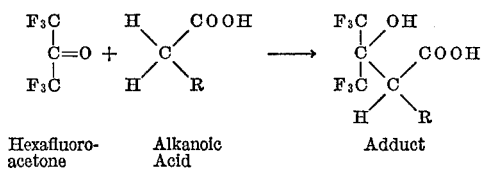

| Hexafluoro-acetone | Alkanoic Acid | Adduct | wherein R represents hydrogen, phenyl, an alkyl group of 1 to 7 carbon atoms or the radical —$(CH_2)_n$COOH wherein n is an interger from 1 to 7 inclusive.

Thus when R is hydrogen, phenyl or alkyl, the alkanoic acid reactant and the corresponding product are monocarboxylic acids; when R is the radical —$(CH_2)_n$COOH, the alkanoic acid reactant and the product are dicarboxylic acids.

Among the dicarboxylic acids which react to form reaction products with hexafluoroacetone according to our invention are succinic acid (butanedioic acid),
glutaric acid (pentanedioic acid),
pimelic acid (heptanedioic acid),
suberic acid (octanedioic acid),
azelaic acid (nonanedioic acid) and
sebacic acid (decanedioic acid).

Among the monocarboxylic acids which react to form reaction products with hexafluoroacetone according to our invention are acetic acid,
phenyl acetic acid,
propionic acid,
butyric acid,
valeric acid,
caproic acid,
enanthic acid,
caprylic acid and
pelargonic acid Specific illustrative compounds which can be prepared according to the process of our invention are shown below.

(I) 2-(hexafluoro-2-hydroxy-2-propyl) - ethanoic acid, from hexafluoroacetone and acetic acid

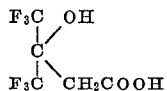

(II) 2 - (hexafluoro-2-hydroxy-2-propyl)-2-phenyl ethanoic acid from hexafluoroacetone and phenyl acetic acid

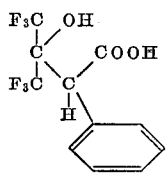

(III) 2 - (hexafluoro-2-hydroxy-2-propyl) - propanoic acid, from hexafluoroacetone and propionic acid

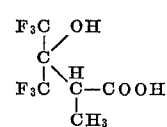

(IV) 2 - (hexafluoro-2-hydroxy-2-propyl) - butanoic acid, from hexafluoroacetone and n-butyric acid

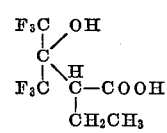

(V) 2 - (hexafluoro-2-hydroxy-2-propyl) - nonanoic acid, from hexafluoroacetone and pelargonic acid

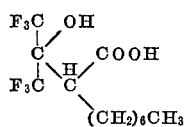

(VI) 2 - (hexafluoro-2-hydroxy-2-propyl) - 1,4-butanedioic acid, from hexafluoroacetone and succinic acid

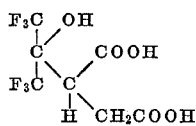

(VII) 2 - (hexafluoro-2-hydroxy-2-propyl) - 1,5-pentanedioic acid from hexafluoroacetone and glutaric acid

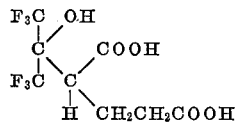

(VIII) 2 - (hexafluoro-2-hydroxy-2-propyl) - 1,6-hexanedioic acid, from hexafluoroacetone and adipic acid

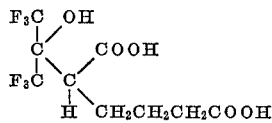

(IX) 2 - (hexafluoro-2-hydroxy-2-propyl)-1,10-decandioic acid, from hexafluoroacetone and sebacic acid

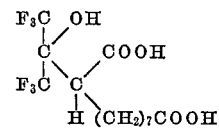

In carrying out the process according to our invention the reactants are mixed, preferably by first charging the liquid or solid alkanoic acid to a pressure vessel, then cooling the contents to below the —27.5° C. boiling point of hexafluoroacetone, suitably to around —75° C. as with Dry Ice and acetone, and condensing the gaseous hexafluoroacetone into the reactor. The reactor is then closed and heated slowly to reaction temperature of at least about 150° C., preferably about 200° to 300° C., and maintained at this temperature until the desired reaction has taken place. Higher temperatures produce somewhat higher reaction rates. However, temperatures higher than about 350° C. are undesirable as they tend to promote decomposition of the reactants. The reactor is then cooled and vented and the liquid product is distilled or extracted with solvent to recover the desired product.

The resulting dicarboxylic acid products are all new compositions of matter, as are all the corresponding monocarboxylic acid products with the exception of the acetic acid product which has been prepared by the prior art process referred to above (i.e. from hexafluoroacetone and malonic acid in a pyridine reaction medium).

All the products prepared by our process, with exception of the phenyl acetic acid product and the known acetic acid product, are useful as surface tension reducing agents. Our new compounds, therefore have the general formula shown below

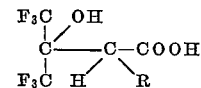

wherein R represents an alkyl group of 1–7 carbon atoms or the radical —$(CH)_n COOH$ wherein $n$ is an integer from 1–7 inclusive.

EXAMPLE 1

A 100 ml. autoclave was charged with 50 grams of hexafluoroacetone (0.30 mole), and 9 grams of acetic acid (0.15 mole). The reactor was closed and heated slowly to 250° C. over a period of about 2 hours. The temperature was then maintained at 250° C. for 65 hours. The reactor was then cooled and vented yielding 35 grams of a liquid. This liquid was vacuum distilled which produced 10 grams of unreacted starting material, 10 grams of 2-(hexafluoro-2-hydroxy-2-propyl)-ethanoic acid, boiling point 87–89° C./25 mm. a yield of 30%, and 15 grams of residue which was a mixture of additional product and tar. The distilled product crystallized on standing. It was purified by recrystallization and yielded a white solid having a melting point of 86–87.5° C. It was compared with a compound prepared from hexafluoroacetone and malonic acid by the procedure of Knunyants Chem. Abstr. 54, p. 22484 (1960) and found to be identical, i.e., 2-(hexafluoro-2-hydroxy-2-propyl)-ethanoic acid.

EXAMPLE 2

An autoclave was charged with 50 grams of hexafluoroacetone (0.30 mole) and 13.2 grams of butyric acid (0.15 mole). The vessel was closed and the reaction mass was heated at 200–250° C. for 100 hours. The reactor was then cooled, opened and found to contain a brown tarry mixture. The mixture was extracted with about 100 grams of methylene chloride. Upon evaporation of the methylene chloride, a semi-solid mixture remained which was extracted with water. Upon evaporation of the water a solid was obtained which was recrystallized from petroleum ether yielding 5 grams (15% yield) of solid 2-(hexafluoro-2-hydroxy-2-propyl)-butanoic acid, having a melting point of 101–104° C., and the elemental analysis shown below, which agrees with the structure $$(F_3C)_2C(OH)CH(C_2H_5)COOH$$

Calculated (percent): C, 33.08; H, 3.17; F, 44.85.
Found (percent): C, 32.98; H, 2.97; F, 45.04.

An infrared spectrogram taken of the above compound showed strong hydroxy, carbonyl and C-F absorption peaks. A compound made by ozonolysis, i.e., by passing ozone into a methanol solution of $$(F_3C)_2C(OH)CH(C_2H_5)CH=CHCH_3$$

followed by addition to the solution of an excess of $H_2O_2$ in sodium hydroxide solution, was found to be identical with the 2-(hexafluoro-2-hydroxy-2-propyl)-butanoic acid prepared as described above.

EXAMPLE 3

An autoclave was charged with 66 grams of hexafluoroacetone (0.40 mole) and 13.2 grams of glutaric acid (0.10 mole). The autoclave was closed and the charge was heated for 160 hours at 225° C. The reactor was then cooled and opened. It contained a brown tarry mixture which was poured into about 250 grams of water. The water was made strongly acidic with HCl (pH about 1) to lower the solubility in water of the product, and was extracted with diethyl ether. Evaporation of the ether yielded 25 grams of crude 2-(hexafluoro-2-hydroxy-2-propyl)-1,5-pentanedioic acid. The recrystallized product had a melting point of 138–141° C. Its elemental analysis, shown below, agreed with the structure $$(F_3C)_2C(OH)CH(COOH)CH_2CH_2COOH$$

Calculated (percent): C, 32.23; H, 2.70; F, 38.23.
Found (percent): C, 32.26; H, 2.60; F, 39.23.

The above compound showed strong absorption peaks in the infrared region for hydroxy, carbonyl and C-F groups.

EXAMPLE 4

An autoclave was charged with 20.5 grams (0.15 mole) of phenyl acetic acid and 50.0 grams (0.30 mole) of hexafluoroacetone. The autoclave was closed and the charge was heated at 250° C. for 75 hours. The reactor was then cooled and opened. The resulting reaction mixture was extracted with about 150 grams of a 5% solution of NaOH solution to remove the acid. The NaOH solution was then made acid with about 100-ml. portions of diethyl ether. The ether solution was then evaporated and yielded 30 grams of a solid product. Analysis of the product by nuclear magnetic resonance indicated a mixture of about 30% hexafluoroacetone-phenyl acetic acid product and about 70% unreacted phenyl acetic acid. The mixture was then twice recrystallized from water, yielding a pure 2-(hexafluoro-2-hydroxy-2-propyl)-2-phenylacetic acid, melting point 191–193° C., with elemental analysis shown below which agreed with the structure $$(F_3C)_2C(OH)CH(C_6H_5)COOH$$

Calculated (percent): C, 43.72; H, 2.67; F, 37.72.
Found (percent): C, 43.86; H, 2.65; F, 37.41.

Infrared absorption curves were run and found to exhibit strong hydroxy, carbonyl, and C-F absorption peaks.

EXAMPLE 5

The compounds of Examples 1–3 were dissolved in water to form 1% solutions and were measured for surface tension reduction recorded in dynes per centimeter.

| Compound of Example No. | Acid reactant | Surface tension (dynes/cm.) |
|---|---|---|
| 1 | Acetic | 52 |
| 2 | Butyric | 42 |
| 3 | Glutaric | 42 |
| Water | | 72 |
| Typical commercial detergents | | 30–45 |

It is apparent from the above table that the new compounds of our invention have surface tension reducing properties which make them useful as wetting and emulsifying agents, a property not shared by the known acetic acid reactant.

While the foregoing describes the preferred embodiments of our invention, it will be understood that departures can be made therefrom within the scope of the specification and claims.

We claim:

1. The process for preparing fluoroalcohol acids having the formula

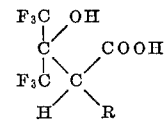

wherein R represents hydrogen, phenyl, an alkyl group of 1–7 carbon atoms or the radical —$(CH_2)_nCOOH$ wherein $n$ is an integer from 1–7 inclusive, which comprises heating a mixture of hexafluoroacetone and an alkanoic acid of the formula

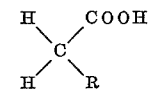

wherein R represents hydrogen, phenyl, an alkyl group of 1–7 carbon atoms or the radical —$(CH_2)_nCOOH$ wherein $n$ is an integer from 1–7 inclusive, at a temperature of at least about 150° C.

2. The process according to claim 1 wherein R represents the radical —$(CH_2)_nCOOH$ wherein $n$ is an integer from 1–7 inclusive.

3. The process according to claim 1 wherein the heating is carried out at a temperature between about 200° C. and about 300° C.

4. The process according to claim 1 wherein the alkanoic acid is acetic acid.

5. The process according to claim 1 wherein the alkanoic acid is butyric acid.

6. The process according to claim 1 wherein the alkanoic acid is glutaric acid.

7. 2-(hexafluoro-2-hydroxy-2-propyl)-alkanoic acids of the formula

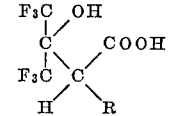

wherein R represents an alkyl group of 1–7 carbon atoms or the radical —$(CH)_nCOOH$ wherein $n$ is an integer from 1–7 inclusive.

8. 2-(hexafluoro-2-hydroxy-2-propyl)butanoic acid of the formula
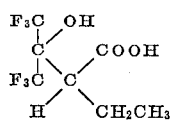
9. 2-(hexafluoro-2-hydroxy-2-propyl)-pentane-1,5 dioic acid of the formula
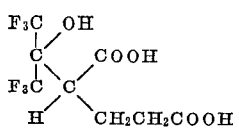
References Cited
UNITED STATES PATENTS
3,075,997  1/1963  Tschesche _____ 260—535X
3,502,732  3/1970  Selman _____ 260—535X
LORRAINE A. WEINBERGER, Primary Examiner
P. J. KILLOS, Assistant Examiner
U.S. Cl. X.R.
252—351; 260—521

PO-1050
(5/69)

UNITED STATES PATENT OFFICE
CERTIFICATE OF CORRECTION

Patent No. 3,574,733      Dated April 13, 1971

Inventor(s) Everett E. Gilbert & James O. Peterson

It is certified that error appears in the above-identified patent and that said Letters Patent are hereby corrected as shown below:

Column 1, line 37, "properly" should read -- property --.

Column 2, line 11, "carboxylic" should read -- carboxyl --.

Column 4, line 55, "$-(CH)_n-COOH$" should read -- "$-(CH_2)_n-COO$

Column 6, line 74, "$-(CH)_nCOOH$" should read -- "$-(CH_2)_n-COOH$

Signed and sealed this 24th day of August 1971.

(SEAL)
Attest:

EDWARD M. FLETCHER, JR.      WILLIAM E. SCHUYLER, JR.
Attesting Officer      Commissioner of Patents